May 20, 1941.　　S. F. VARIAN ET AL　　2,242,249
ELECTRICAL CONVERTER
Filed June 18, 1938　　3 Sheets-Sheet 1

INVENTORS
SIGURD F. VARIAN
WILLIAM W. HANSEN
BY
ATTORNEY.

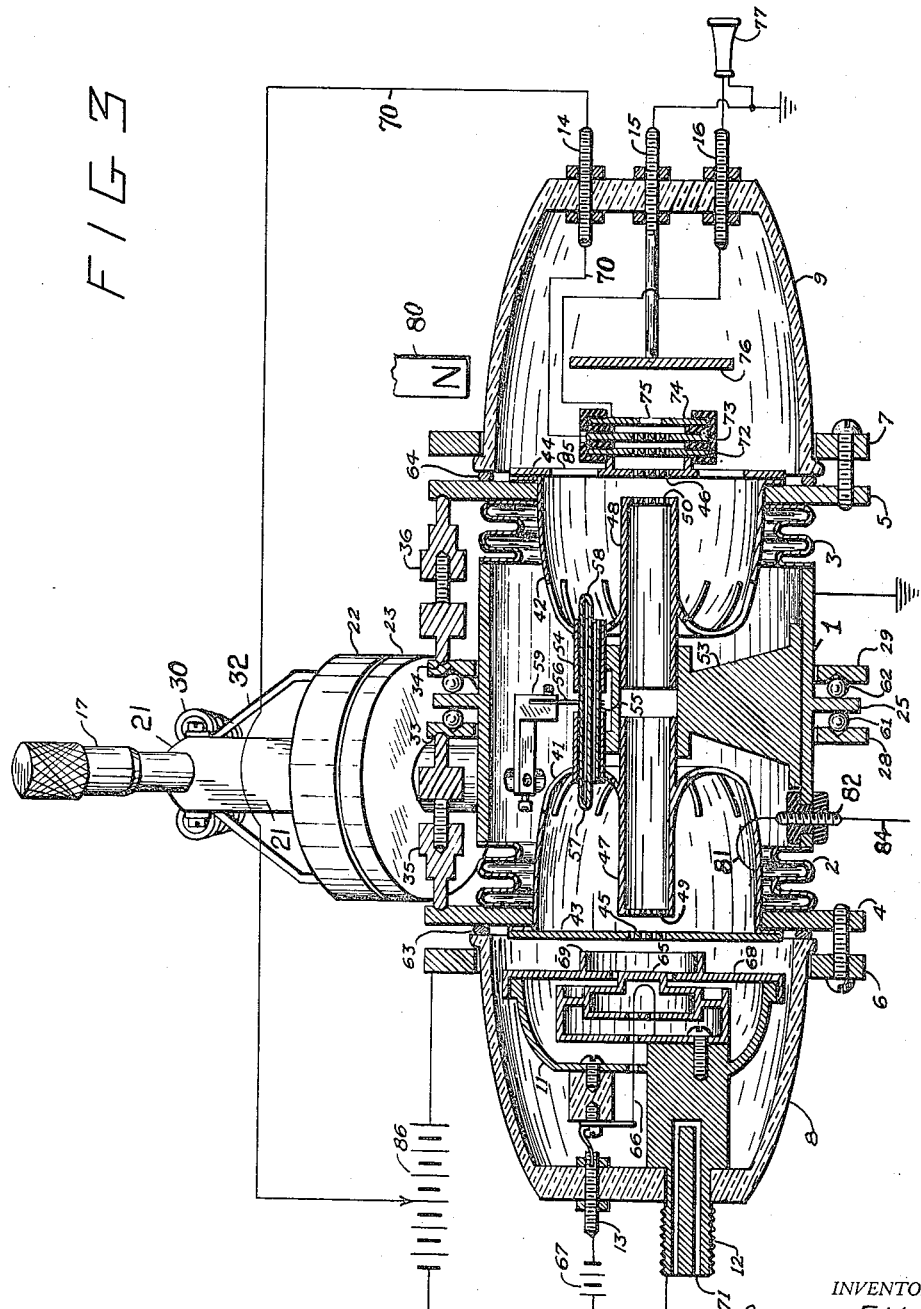

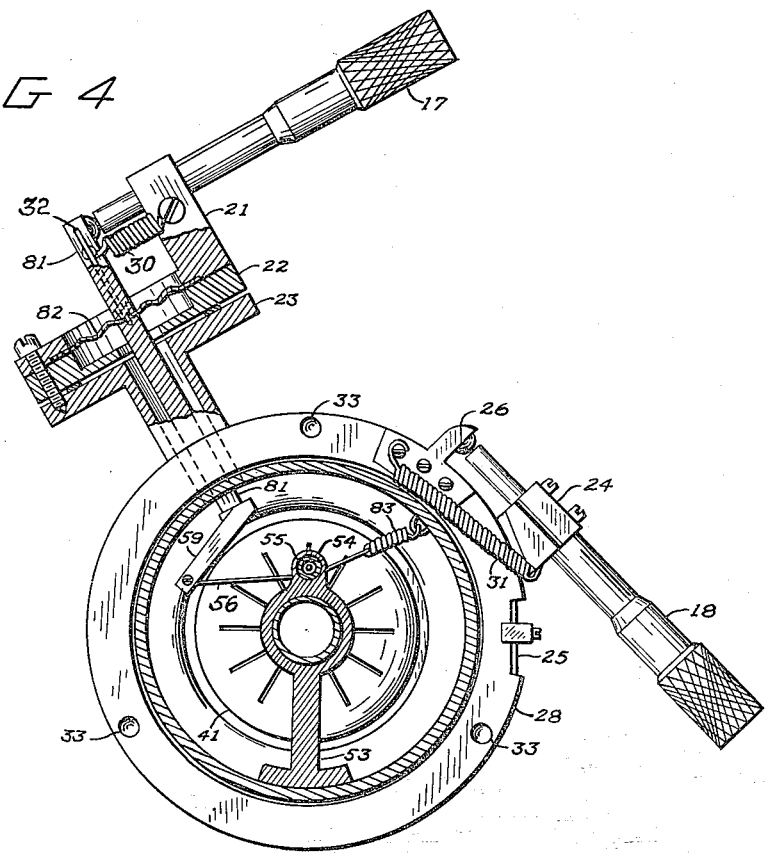

Patented May 20, 1941

2,242,249

UNITED STATES PATENT OFFICE 2,242,249

ELECTRICAL CONVERTER

Sigurd F. Varian and William W. Hansen, Stanford University, Calif., assignors to The Board of Trustees of The Leland Stanford Junior University, Stanford University, Calif., a corporation of California Application June 18, 1938, Serial No. 214,452

15 Claims. (Cl. 250—27)

This invention relates generally to electrical converters having enclosed oscillatory circuits of the type disclosed in copending application Serial No. 168,355, filed October 11, 1937 by Russell H. Varian, one of the inventors herein, and the invention has reference, particularly to novel improvements in this type of converter operating at frequencies of the order of $10^9$ cycles per second.

The principal object of the present invention is to provide a novel practicable embodiment of electrical converter utilizing principles disclosed in the above identified application, the device of the present invention being operable not only as a self oscillator but also as an amplifier and detector.

Another object of the present invention lies in the provision of a novel electrical converter of the above character having easily operable means for effecting frequency and coupling adjustments of the oscillating currents of the converter.

Other objects and advantages will become apparent from the specification, taken in connection with the accompanying drawings wherein the invention is embodied in concrete form.

In the drawings,

Fig. 3 is an enlarged longitudinal section of Fig. 1, showing the electrical connections.

Fig. 4 is a partial section of Fig. 1 taken perpendicularly to the section shown in Fig. 3.

Similar characters of reference are used in all of the above figures to indicate corresponding parts.

Figure 1:
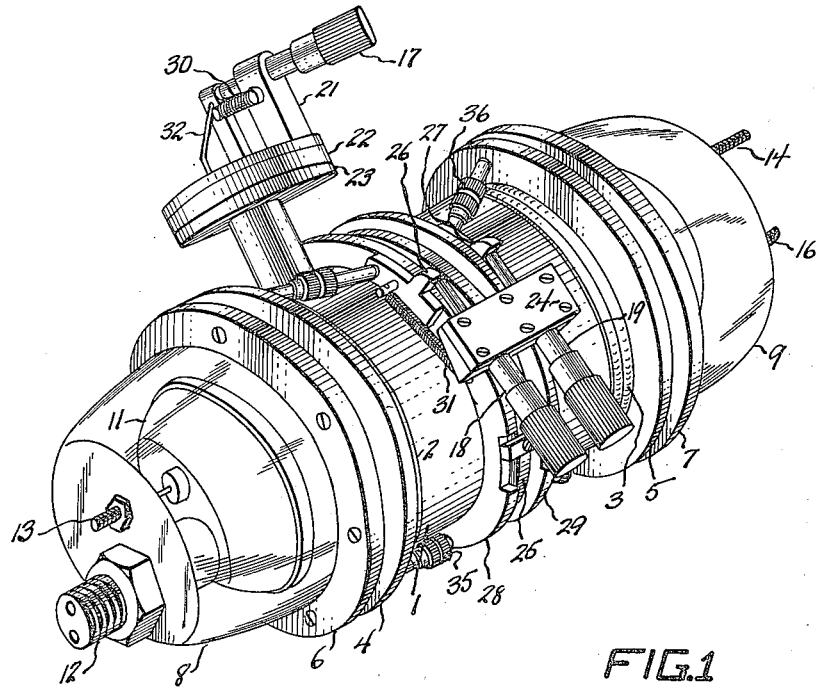
Fig. 1 is an exterior perspective view of the apparatus of the present invention.

Referring now to the drawings, the novel converter apparatus is supported by and contained in a central metal shell 1. At the ends of shell 1 there are provided flexible metal connecting sections 2 and 3 shown as of the bellows type to which are secured rings 4 and 5, respectively. Attached to this assembly by clamping rings 6 and 7 and screws threaded into rings 4 and 5 are end bells 8 and 9, shown as of glass and sealed by gaskets 63 and 64.. It will be apparent that lead seals 63 and 64 may be replaced by metal to glass seals in a baked-out tube. The housing assembly consisting of shell 1 and end bells 8 and 9 is suitably evacuated. The end bell 8, at the left, contains an electron emitter structure 11, one side of the heating filament 66 of which is connected through post 13 to one side of battery 67, whereas the other side of the filament 66 is connected through a bolt 12 to battery 67. Emitter 11 is supported by bolt 12 of high thermal conductivity and extending outwardly through the end of bell 8. The bell 9, at the right, contains electrodes connected to terminals 14, 15, and 16.

Mounted on the outside of shell 1 there are three micrometer screws 17, 18, 19 for the adjustment of elements of the apparatus. Screw 17 is supported on a bracket 21, which is in turn supported by a clamping ring 22 attached to a circular support 23 having a hollow shank threaded into shell 1. Screw 17 adjusts the coupling inside the mechanism as will be further explained. Screws 18 and 19 are supported by a clamp 24 which is fastened to a ring 25 formed as a radial flange on shell 1. Screws 18 and 19 act on radial projections 26 and 27 which are attached to circular rings 28 and 29 fitted on shell 1 so they can rotate smoothly around shell 1. Rings 28 and 29 are constrained against screws 18 and 19 in their circular motion by springs 31. Rings 28 and 29 have each three depressions or sockets, indicated at 33 in ring 28 and 34 in ring 29, into which sockets the inner ends of adjustable screw toggle thrust connections 35 and 36 respectively, project. Connections 35 and 36 are normally arranged to occupy positions in a cylindrical zone concentric with shell 1, but with their axes slightly inclined from lines parallel to the axis of the shell. The outer ends of connections 35 and 36 opposite rings 28 and 29 project in corresponding depressions or sockets in rings 4 and 5. Rotation of rings 28 and 29 by turning screws 18 and 19 change the inclination of connections 35 and 36 and consequently effect axial displacement of rings 4 and 5 by toggle action. This displacement is accommodated by the flexing of connections 2 and 3.

Figure 2:
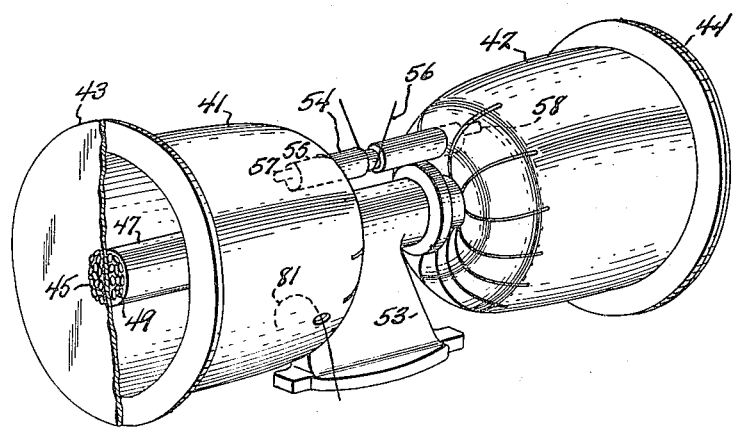
Fig. 2 is a perspective view of a part of the mechanism contained in Fig. 1.

Fig. 2 shows, on a scale larger than that of Fig. 1, a portion of the apparatus contained inside shell 1. In this figure there are two enclosed electron-excitable resonant circuit members 41 and 42 of the "rhumbatron" type substantially as disclosed in the copending application of W. W. Hansen, now Patent No. 2,190,712 dated February 20, 1940, and application Serial No. 168,355. These circuit members are conveniently referred to by the name "rhumbatron." "Rhumbatrons" 41 and 42 have end plates 43 and 44 respectively which contain grids 45 and 46. The interior of the members 41 and 42 are formed into projections 47 and 48 which terminate in grids 49 and 50. Resonant circuit members 41 and 42 are interconnected by tubes 51 and 52 extending into an aligned aperture in a bracket 53 which is mounted inside shell 1 and fixedly supports tubes 51 and 52. Bracket 53 has a bearing 54 at its upper portion inside which bearing is a small concentric electrical line 55 that is adapted to be rotated by a wire 56. Concentric line 55 terminates in "rhumbatron" 41 with a loop 57 and in "rhumbatron" 42 with a loop 58. Wire 56 has one end thereof attached to the free end portion of an arm 59 provided on the lower end portion of a lever 81. Wire 56 is wrapped one or more times around the concentric line 55 and has its other end attached to a tension spring 83 that is fastened to the inner wall of shell 1. Lever 81 is connected intermediate its length to a sealing disc 82, shown as having annular corrugations and with its periphery gripped between bracket 21 and clamping ring 22. Lever 81 is shown provided with trunnions 32 that are pivoted in depressions provided in the annular portion of bracket 21 on a line with the plane of disc 82, whereby lever 81 pivots at its connection with disc 82. Springs 30 urge the upper end of lever 81 against the end of screw 17.

Both "rhumbatrons" or resonant circuit members 41 and 42 are slotted in their rounded portions as shown, whereby they may be deflected to change the distance between their grids, for example, between grids 45 and 49 in "rhumbatron" 41. The structure shown in Fig. 1 including shell 1 and end bells 8 and 9 is made airtight and evacuated.

Rings 28 and 29 are subjected to the atmospheric load exerted on the end bells 8 and 9 which load is communicated to rings 28 and 29 by rings 4 and 5 acting through toggle connections 35 and 36. This load is transmitted by rows of balls 61 and 62 to ring 25 which balls are held in races provided in rings 25 and 28 and 29. It will be seen by reference to Fig. 3 that displacement of ring 4, for example, by turning screw 18 to actuate toggle connection 35 will flex connecting section 2 and "rhumbatron" 41, thereby changing the distance between grids 45 and 49 and accomplishing frequency adjustment of "rhumbatron" 41. "Rhumbatron" 42 may be similarly adjusted by turning screw 19.

The emitter structure 11 is provided with an active surface 65 which emits electrons when heated by filament 66 receiving current from battery 67. The emitting surface 65 may be coated with an active oxide coating or made in some other convenient way. The surface 65 is arranged at the center of a coplanar surface 68 which has a projecting ring 69. These surfaces are formed so the electrons emitted from surface 65 are collimated into a beam that can pass through the grids 45, 49, 50, and 46. The structure 11 is made so that the stray heat from filament 66 is conducted readily through bolt 12 which is preferably drilled with holes 71 through which water may be circulated for cooling.

End bell 9 contains two mutually spaced grids 72 and 73, a plate 74 provided with a hole 75 in its center, and a fluorescent screen 76. Grid 72 shown connected to "rhumbatron" 42 cooperates with grid 46 in directing the electrons between grid 46 and grid 73. This grid 72 may be omitted, if desired, although its use enhances the sensitivity of the detector. Grid 73 is a detector grid biased for detection by the lead 70 connected to battery 86 and in the way described in copending applications Serial Nos. 201,898 and 185,382 of the applicants hereof. Plate 75 acts as a plate for detection of signals which are shown utilized in a receiver 77 or in any other convenient apparatus. The action of plate 75 is also described in the above applications. A loop 81 within oscillatory circuit member 41 is shown connected through terminal post 82 to lead 84 which is fed from any desired source of modulated high frequency. Fluorescent screen 76 is used as described in Serial No. 201,898 for observation of the operation of the apparatus.

In use, the apparatus of this invention may serve as a self-oscillator, an amplifier, or as a detector, in accordance with the methods of operation shown in copending Serial Nos. 168,355, 185,382, and 201,898. The assemblage as shown, however, is specially adapted to a novel method of transmission and reception. In this method of operation, radiation takes place from a hole or a series of holes 85 in the end of "rhumbatron" 42 as shown in Fig. 3. A property of the "rhumbatron" type of resonant circuit is that of radiation from holes in its surface. This property was disclosed in Serial No. 185,383.

In operation, electrons are emitted by emitter 65. They are accelerated by the potential difference of a battery 86 connected between emitter 65 and grid 45 so they pass through grid 45 into the space between grid 45 and grid 49. In the space between grids 45 and 49 there is an alternating electric field, the axis of which is in the direction of travel of the electrons, that is, parallel to the axis of the system. The electrons in the field between grids 45 and 49 are accelerated or retarded in the field depending upon the momentary polarity of the field between grids 45 and 49. If grid 45 is positive, grid 49 negative, the electrons moving therebetween are retarded. If grid 45 is negative, grid 49 is positive, the electrons moving therebetween are accelerated. The field polarity reverses, of course, in accordance with the frequency of operation of the system.

The electrons which are accelerated will leave the field through grid 49 with velocities higher than those electrons which are retarded, and as the electrons travel through tubes 47 and 48 the fast electrons will gain on the slower ones, and consequently the electrons will arrive in bunches at grid 50. These bunches will correspond to the frequency of the system. The bunches of electrons enter the space between grids 50 and 46 wherein they pass through an alternating field similar to the one between grids 45 and 49. The admission of electrons in bunches into the field between grids 50 and 46 has the same effect as impressing a periodic field between grids 50 and 46, and they thereby maintain oscillations in "rhumbatron" 42.

Energy from "rhumbatron" 42 is transferred to "rhumbatron" 41 through the coupling loops 58 and 57 and the concentric line 55 connected between loops 57 and 58. The length of the tubes 47 and 48 between grids 49 and 50 is determined by the frequency of the system and the voltage of the battery 86. These factors determine the phase of the arrival of the electron bunches at grid 50. Variation of the rotational position of coupling loops 57 and 58 control the feed-back of energy from "rhumbatron" 41. When screw 17 is turned, the wire 56 is moved longitudinally and the concentric line 55 is rotated. The ends of line 55 terminating in loops 57 and 58 rotate with the rest of line 55 and the loops 57 and 58 thus are caused to change the coupling between them and the fields of "rhumbatrons" 41 and 42. This, of course, varies the coupling between "rhumbatrons" 41 and 42.

Transmission of radiant energy from the system occurs through the holes 85 in the end of "rhumbatron" 42. The radiation is somewhat directional, spreading out from the holes 85 as a cone. Reception of radiation is also accomplished through holes 85. Radiation entering holes 85 produces a field in "rhumbatron" 42, from which energy is transferred to "rhumbatron" 41 through coupling loops 57 and 58. Electron bunching occurs in "rhumbatron" 41 and the field of "rhumbatron" 42 is built up accordingly, and the system acts like other regenerative receivers with energy introduced into the plate circuit. Holes 85 may be made in either "rhumbatron" 41 or in "rhumbatron" 42. For operation as a transmitter it is considered preferable to have the radiating openings 85 in "rhumbatron" 42, but for reception it is considered better to have the openings 85 in "rhumbatron" 41. If placed in "rhumbatron" 41 the holes 85 are put in plate 43. The size of holes 85 and their number and distribution in the "rhumbatrons" is subject to calculation in design and their dimensions and placement will depend upon the desired conditions of operation.

Detection is accomplished in the ways set forth in Serial No. 185,383 and Serial No. 201,898. Grid 73 is biased at such a potential as will either stop a majority of the electrons approaching it at average velocity, or will cause a majority of them to go through this grid. In either case, variation of velocity will cause a change in the number of electrons passing through grid 73 and hitting the plate 74. Modulation of the signal with the consequent variation of electron velocities in the system is thereby detected in receiver 77.

Velocity analysis of the electron beam for observation may be accomplished by subjecting that portion of the electron beam which goes through the hole 75 in plate 74 either to a magnetic force produced as by a magnet 80 placed outside the end bell 9 or to an electrostatic force within the bell in the manner disclosed in application Serial No. 201,898. Under the influence of the magnetic field of magnet 80 the electrons are deflected in amounts depending on their velocities, and a track appears on fluorescent screen 76.

The details of design and dimension of the apparatus shown may be changed materially from those shown in the drawings. Apparatus built substantially to the actual dimensions of Fig. 3 has been found to operate satisfactorily on frequencies of the order of $3 \times 10^9$ cycles per second. The particular form of "rhumbatrons" 41 and 42 has certain advantages over the forms shown in copending applications Serial Nos. 168,355 and 185,383. The flat ends 43 and 44 have structural advantages and also at the emitter the flat surface 43 makes it possible to get a uniform field between the emitter 65 and grid 45 without the aid of a collimating grid such as used in Serial No. 168,355. The dimensions of "rhumbatrons" 41 and 42 are made according to calculated values known to give the desired values of frequency, ratio of energy stored to energy lost per cycle, and electron interaction resistance. The expression "electron interaction resistance" has reference to the characteristic of the "rhumbatron" in the transfer of energy between the "rhumbatron" and the electrons passing through it. For convenience the expression is shortened to "interactance."

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

The electron interaction resistance of a "rhumbatron" is the equivalent ohmic resistance which would extract the same energy from high frequency current through it, as the "rhumbatron" extracts from the component of the electron beam having the same frequency as the resonant frequency of the "rhumbatron."

What is claimed is:

1. In an electrical converter, a pair of mutually spaced hollow internally resonant circuit members arranged to have standing electromagnetic waves therein, means for electrically coupling said circuit members, a casing for retaining said circuit members in an evacuated condition, and means without said casing and having operating linkage extending thereinto for selectively varying said coupling means and the operating frequency of said circuit members.

2. In apparatus of the kind described, the combination of elements including an electron emitter, a pair of hollow internally resonant circuit members, means providing feed-back coupling between said resonant circuit members, means for varying said coupling means, means arranged to excite said circuit members by a beam of electrons from said emitter, and means for maintaining a substantial vacuum within said elements.

3. In apparatus of the kind described, an adjustable electron-excitable resonant circuit comprising a cylindrical conducting housing having one end thereof rounded and provided with a re-entrant central portion and the other end thereof being formed flat, said housing being slotted radially in its rounded portion to obtain flexibility for adjustment of the longitudinal inside dimensions of said circuit.

4. An adjustable electron-excitable resonant circuit as described in claim 3, wherein the re-entrant central portion and the flat end of said housing are perforated to form adjacent grids concentric with the axis of the circuit.

5. In apparatus of the kind described, the combination of a shell of adjustable longitudinal dimension, and a pair of electron-excitable resonant circuit members, each of said circuit members being subject to change in its longitudinal dimensions, said circuit members being symmetrically assembled in said longitudinally adjustable shell, the assemblage being arranged so that selective longitudinal adjustment of the said shell communicates corresponding longitudinal adjustments to the individual resonant circuit members.

6. In apparatus of the kind described, the combination of an air-tight case provided with a flexible sealed joint, a pair of electron-excitable resonant circuit members, a coupling loop in each circuit member, said loops being interconnected by a pair of conductors arranged to be rotated along with said loops to vary the coupling between the pair of circuit members, the circuit members and coupling loops being contained in said air-tight case, and movable means outside said case and extending through said flexible joint for rotating said loops.

7. In apparatus of the kind described the combination of an evacuated adjustable case and an electron beam oscillatory circuit therein, means for adjusting said case and means for communicating the adjustment of said case to the oscillatory circuit contained therein.

8. In apparatus of the kind described the combination of an evacuated adjustable case and a pair of variable electron beam oscillatory circuits therein, said case being formed in part by a flexible metal bellows, and means for adjusting said case by the deflection of said bellows while simultaneously varying said circuits.

9. A longitudinally adjustable evacuated container and oscillatory apparatus contained therein comprising a plurality of interconnected hollow internally resonant conducting members, the operating characteristics of said members being variable by adjustment of said container.

10. An evacuated container for oscillatory apparatus comprising a plurality of coupled internally resonant conducting members, said container having flexibly related parts, said container being adjustable by longitudinal relative displacement of said flexibly related parts, and toggle mechanism for relatively displacing said parts.

11. An evacuated container for oscillatory apparatus comprising a plurality of coupled hollow internally resonant conducting members, said container being adjustable by longitudinal relative displacement of flexibly related parts of said container to vary the electrical characteristics of said resonant conducting members, and a rotating member and connected mechanical conversion means for effecting said relative displacement.

12. In an apparatus of the character described, a pair of mutually spaced oscillatory hollow circuit members, each of said members having relatively closely spaced grids, the grids of one circuit member being aligned with those of the other, means for directing electrons through said aligned grids to effect oscillations within said circuit members, and means for tuning one of said circuit members to the other.

13. In an apparatus of the character described, a pair of mutually spaced oscillatory hollow circuit members, each of said members having relatively closely spaced grids, the grids of one circuit member being aligned with those of the other, means for directing electrons through said aligned grids to effect oscillations within said circuit members, means for tuning one of said circuit members to the other, means for supplying a modulated signal to one of said circuit members, and detector means associated with the other of said circuit members for detecting said modulation.

14. In an apparatus of the character described, a pair of mutually spaced hollow circuit members, each of said members having relatively closely spaced grids, the grids of the first of said circuit members being aligned with those of the second, means for supplying a high frequency signal to the first of said circuit members, means for directing electrons through the grids of the first circuit member and then through the grids of the second circuit member, said circuit members being of such nature and so spaced that amplification of the signal is obtained in the second circuit member.

15. In an apparatus of the character described, a pair of mutually spaced hollow circuit members, each of said members having relatively closely spaced grids, the grids of the first of said circuit members being aligned with those of the second, means for supplying a high frequency modulated signal to the first of said circuit members, means for directing electrons through the grids of the first circuit member and then through the grids of the second circuit member, said circuit members being so constructed and arranged and so spaced that amplification of said signal is obtained in the second of said circuit members, and means associated with said second circuit member for detecting said signal.

SIGURD F. VARIAN.
WILLIAM W. HANSEN.